United States Patent [19]
Andres et al.

[11] 3,724,752
[45] Apr. 3, 1973

[54] CONTROL DEVICE FOR CONTROLLING HEATING AND AIR-CONDITIONING INSTALLATIONS IN MOTOR VEHICLES

[75] Inventors: Rudolf Andres; Albert Stolz, both of Sindelfingen; Hermann Möller, Aidlingen, all of Germany

[73] Assignee: Daimler-Benz Aktiengesellschaft, Stuttgart-Unterturkheim, Germany

[22] Filed: Sept. 4, 1970

[21] Appl. No.: 69,721

[30] Foreign Application Priority Data

Sept. 6, 1969    Germany.....................P 19 45 232.5

[52] U.S. Cl.....................236/86, 165/42, 237/12.3 A
[51] Int. Cl. ...............................................B60h 1/02
[58] Field of Search.....236/16, 49, 86, 78 B; 165/16, 165/42; 337/2; 62/164, 180, 187; 237/12.3 A

[56] References Cited

UNITED STATES PATENTS

| 2,745,257 | 5/1956 | Jacobs | 62/164 |
|---|---|---|---|
| 3,411,713 | 11/1968 | Wallace et al. | 236/15 A |
| 3,003,320 | 10/1961 | Obermaier | 165/16 X |
| 3,191,669 | 6/1965 | Johnson et al. | 165/25 |
| 3,386,656 | 6/1968 | Bergquist | 236/15 A |
| 3,410,486 | 11/1968 | Rodgers | 165/16 X |
| 3,490,518 | 1/1970 | Herbon | 165/42 |

*Primary Examiner*—William E. Wayner
*Attorney*—Craig, Antonelli and Hill

[57] ABSTRACT

A control device for controlling heating and air-conditioning installations in motor vehicles, particularly in passenger motor vehicles, which controls by means of vacuum, an adjusting motor actuating the fresh or warm air flaps; the control device includes a flap control switch and a temperature switch whereby the flap control switch, which selectively controls the adjusting motor, is adjusted by a rotary knob into a preselected condition of either "air-conditioning off" or "air-conditioning on"; the two switches are preferably arranged in a common housing and the temperature switch is adjustable within an angular range of less than 330° without changing a shifting rod controlling the actuation of the adjusting motor from its position "air-conditioning."

31 Claims, 5 Drawing Figures

PATENTED APR 3 1973 3,724,752
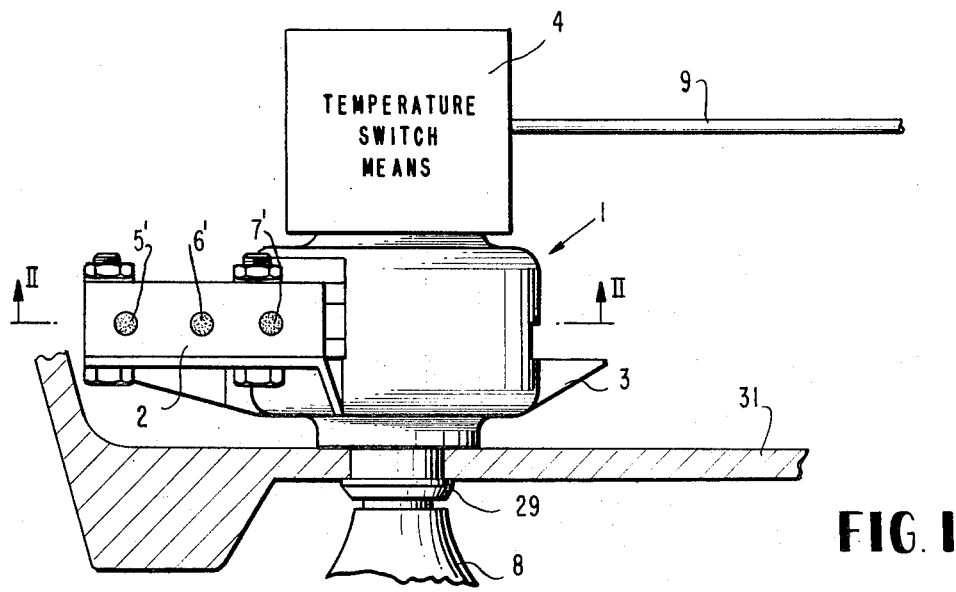
FIG. 1
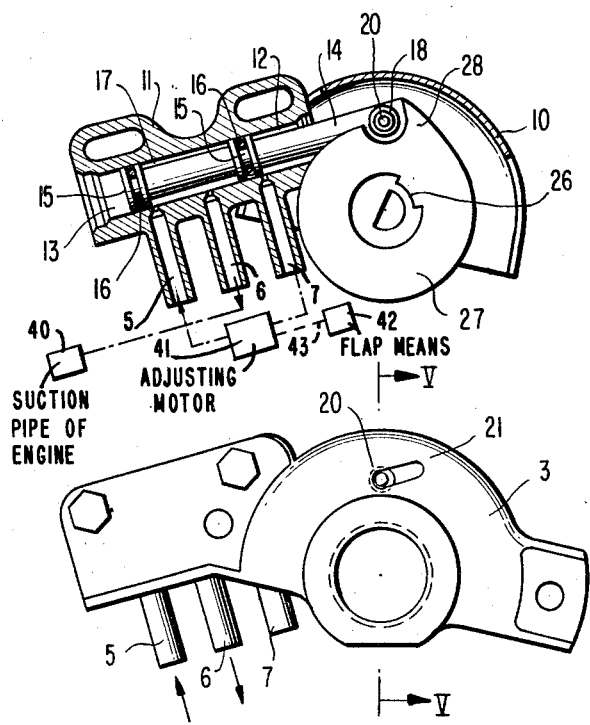
FIG. 2
FIG. 4
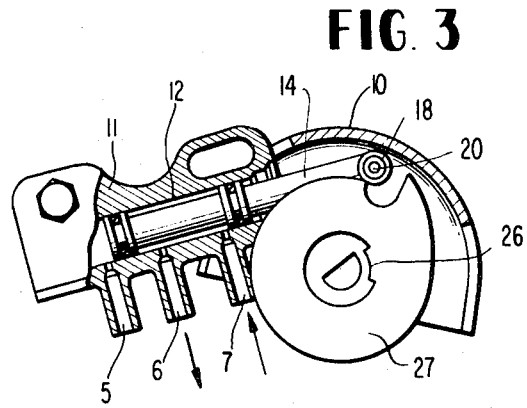
FIG. 3
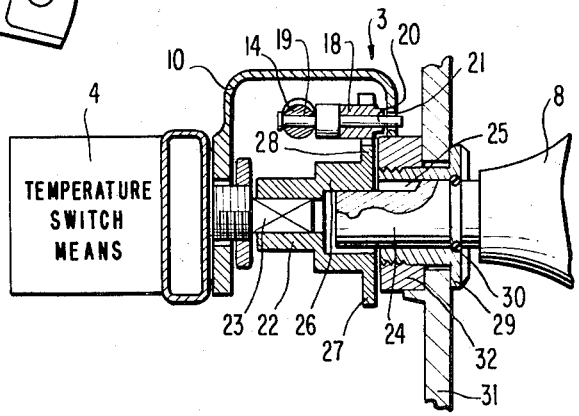
FIG. 5

CONTROL DEVICE FOR CONTROLLING HEATING AND AIR-CONDITIONING INSTALLATIONS IN MOTOR VEHICLES

The present invention relates to a control device for the control of heating and air-conditioning installations in motor vehicles, especially passenger motor vehicles which controls by means of vacuum an adjusting motor actuating the fresh or warm-air flaps or dampers.

In order to attain both during high as well as also during low outside temperatures a uniform air-conditioning in the vehicle interior, the known prior art heating installation in motor vehicles can be complemented and completed by an air-conditioning installation. The heating flaps and the ventilating flaps must be brought into a predetermined position during the actuation of the air-conditioning installation in order that the undesired supply of fresh or warm air is avoided. With the known motor vehicles equipped with an air-conditioning installation, this adjustment has to be undertaken by the driver himself. This adjustment is complicated and does not preclude that high temperature fluctuations occur in the vehicle interior and that possibly in case of an erroneous opening or closing of the individual flaps or dampers, the air-conditioning installation and the heating installation operate against one another.

The present invention excludes these disadvantages of the prior art air-conditioning installations and aims, with the use of the vacuum of the suction pipe as servo-energy, to automatically control with simple constructive measures the heating and air-conditioning regulation in the vehicle interior.

The underlying problems are solved according to the present invention in that the control device consists of a flap control switch and of a temperature switch, and in that the flap control switch which adjusts the actuating motor, is adjusted by a rotary knob into a preselected climatic condition of either "air-condition installation off" or "air-conditioning installation on." The driver, therefore, only needs to preselect a predetermined end condition, for example, depending on the outside temperature "cooling" or "heating" and the preselected temperature level is then kept at a predetermined level independently of smaller temperature fluctuations in the atmosphere surrounding the vehicle.

According to a particularly advantageous embodiment of the present invention, the flap control switch and the temperature switch are arranged in a common housing and the flap control switch includes a pot-shaped cylindrically constructed housing part that is opened laterally and an elongated housing part which is in communication with the cylindrical part by way of a channel that terminates in the atmosphere at the end opposite the cylindrical housing part. This compact construction of the flap control switch and of the temperature switch in a common housing which, as to the rest, may be constructed divided, is functionally very advantageous because the temperature regulator and the flap control switch, to which is connected the adjusting motor adjusting the flaps, may be adjusted in unison by means of the rotary knob. However, such construction also offers at the same time the advantage that it requires only little space and the installation can be accommodated at the instrument panel readily accessible between the operating elements.

According to a further advantageous construction of the present invention, three vacuum lines disposed one adjacent the other may terminate laterally in the housing channel, of which the center vacuum line is connected with the suction pipe of the engine and the two other vacuum lines with the adjusting motor. A shifting rod is disposed appropriately in the housing channel which projects partially into the cylindrical housing part. This shifting rod may advantageously possess a smaller diameter than the housing channel and may include two sections which are provided with sealing elements that slide sealingly along the channel wall. The sections may be arranged on the shifting rod at such a distance from one another that the vacuum line in communication with the suction pipe is connected at any time with only one of the vacuum lines of the adjusting motor by way of the space enclosed by the sealing elements.

In order to enable an easy displacement of the shifting rod, the shifting rod may include at its end projecting into the cylindrical housing part, a guide sleeve which is rotatably connected at its one end with the shifting rod by means of a pin and receives at its other end a guide bolt that engages in a guide slot provided in the housing cover. This guide bolt guided in the guide slot assures that the shifting rod is positively guided and cannot slide out of the housing channel in its two end positions. Additionally, the bolt precludes advantageously a rotation of the control slide valve.

An offset bushing may be advantageously arranged in the cylindrical housing part which is in communication with the atmosphere; the connecting pin of the temperature switch and the connecting pin of the rotary knob may engage into the bushing. The connecting pin of the rotary knob which is secured at the instrument panel, may be provided with a groove-shaped recess of a width extending over a predetermined angle of its circumference, into which the bush engages rotatably. This means that the connecting pin of the rotary knob, by means of which the temperature level of either "cooling" or "heating" is preselected, is not rigidly connected with the bush but has a lost motion-connection. In contradistinction thereto, the connecting pin of the temperature regulator which is flattened or beveled off advantageously on one side, is rigidly connected with the bush, i.e., for rotation in unison therewith.

According to a further advantageous construction of the present invention, the bush may include at its one end a predominantly circularly shaped flat disk which possesses along its contour a saw-toothed shaped cam that partially surrounds the guide bolt. With a rotation of the bush by the rotary knob or by the temperature regulator, the shifting rod is moved to and fro in the channel whereby a control of the adjusting motor takes place.

It is advantageous if the connecting pin of the rotary knob is guided at its end projecting out of the cylindrical housing part in a collar and is retained in this collar by means of a snap ring. The collar is screwed into a reinforcing ring of the cylindrical housing part so that the control device may be secured in a simple manner at the instrument panel with the aid of the collar. It may also be advantageous that the rotary knob locks or engages in a detent in its two end positions so that no undesirable adjustment of the preselected climatic condition can take place. Since the saw-tooth shaped cam surrounds the guide bolt only from one side, the temperature switch can be appropriately adjusted within an angular range of less than 330 without changing the shifting rod in its position of "air-conditioning installation on" or "cooling."

Accordingly, it is an object of the present invention to provide a control device for heating and air-conditioning installations in motor vehicles which avoids by simple means the aforementioned shortcomings and drawbacks encountered in the prior art.

Another object of the present invention resides in a control device for controlling the heating and air-conditioning installations in motor vehicles which operates substantially automatically to close and open the required flaps and/or dampers so as to eliminate any erroneous actuation thereof on the part of the driver.

A further object of the present invention resides in a control device for controlling an air-conditioning installation in motor vehicles which is simple and compact in construction yet very advantageous in operation and functioning.

These and other objects, features, and advantages of the present invention will become more obvious from the following description when taken in connection with the accompanying drawing which shows, for purposes of illustration only, one embodiment in accordance with the present invention, and wherein:

FIG. 1 is an overall view of the control device in accordance with the present invention mounted on the instrument panel;

FIG. 2 is a cross-sectional view through the control device taken along line II—II of FIG. 1 with an inserted bush in the position "air-conditioning installation off;"

FIG. 3 is a cross-sectional view, similar to FIG. 2, illustrating the position of the parts in the position "air-conditioning installation on;"

FIG. 4 is a view of the control device prior to mounting on the instrument panel; and FIG. 5 is a cross-sectional view taken along line V—V of FIG. 4.

Referring now to the drawing wherein like reference numerals are used throughout the various views to designate like parts, and more particularly to FIG. 1, the overall arrangement of the control device generally designated by reference numeral 1 in accordance with the present invention is illustrated in this figure. Whereas the flap control switch 2 is arranged in the upper housing part of the housing 3, the temperature switch 4 of conventional construction and operable to control the temperature so as to maintain the same at a preselected level, is disposed in the lower part of the housing 3. The vacuum lines 5, 6, 7, for the adjusting motor 41 which actuates the flaps or dampers by conventional means, such as linkages are connected at the housing 3 to the side of the flap control switch 2 opposite the dots 5', 6' and 7'. The dots 5', 6' and 7' may be constructed of different color and indicate the vacuum lines 5, 6 and 7. A predetermined condition of the heating-air-conditioning system is adjusted by means of the rotary knob 8 which condition is maintained with the aid of the temperature switch 4 independently of the fluctuations of the outside temperature. The temperature switch 4 is equipped for that purpose with a conventional sensing member 9 which controls the temperature switch 4 in dependence on the temperature prevailing in the passenger space of the motor vehicle.

It can be seen from FIG. 2 that the flap control switch 2 includes a pot-shaped cylindrical housing part 10 that is opened laterally and is in communication with the atmosphere, and an elongated housing part 11 which is in communication with the cylindrical part 10 by way of a channel 12. The channel 12 terminates at its end opposite the cylindrical housing part 10 in the atmosphere. Three vacuum lines 5, 6, and 7 disposed one adjacent the other are arranged laterally at the housing channel 12. The center vacuum line 6 is in communication with the suction pipe 40 of the engine as shown by dashed-dot line. The left vacuum line 5 and the right vacuum line 7 represent each a connection with the adjusting motor 41 as shown by dashed-dot line, the motor 41 controlling a flap means 42 by conventional means such as linkages 43 shown schematically in dashed line. It can be additionally seen from FIG. 2 that a shifting rod 14 is arranged in the housing channel 12 which with its right end, as viewed in this figure, partially projects into the cylindrical housing part 10 of the housing 3. The shifting rod 14 advantageously possesses a smaller diameter than the channel 12 and includes two sections which are provided with sealing elements 16 that slide sealingly along the wall of the housing channel 12. As a result of the sections 15 provided with the sealing element 16, a closed space 17 is formed which, in its longitudinal extent, is so dimensioned that only two vacuum lines, and more particularly the center vacuum line 6 is in communication either with the left vacuum line 5 or with the right vacuum line 7. Consequently, a shifting of the adjusting motor takes place by the displacement of the shifting rod 14 in the housing channel 12.

Whereas the position of "air-conditioning installation off" is illustrated in FIG. 2, FIG. 3 illustrates the position "air-conditioning installation on."

It can also be seen from FIGS. 2 and 3 that the shifting rod 14 includes a guide sleeve 18 at its end projecting into the cylindrical housing part 10, which is rotatably connected at its one end with the shifting rod 14 by means of a pin 19 and which is provided at its other end with a guide bolt 20 that engages in a guide slot 21 disposed in the housing cover of the housing 3 (see also FIGS. 4 and 5).

FIG. 4 illustrates a plan view on the housing 3 with the shifting rod 14 in the position of "air-conditioning installation off." It can be seen from FIG. 5 which illustrates a cross section taken along line V—V of FIG. 4, that an offset or stepped bush 22 is arranged in the cylindrical housing part 10, into which engage the connecting pin 23 of the temperature switch 4 and the connecting pin 24 of the rotary knob 8. The connecting pin 24 of the rotary knob 8 is provided with a groove-shaped recess 25 extending over a predetermined angle of its circumference, into which the bush 22 engages rotatably with a nose portion 26. The nose portion 26 of the bush 22 can also be seen in FIGS. 2 and 3. Consequently, no rigid connection exists between the rotary knob 8 and the bush 22, the recess 25 and nose portion 26 forming in effect a lost-motion connection, so that the bush 22 can be rotated within a certain range with respect to the connecting pin 24 of the rotary knob 8 by the temperature control device 4. The connecting pin 23 of the temperature control device 4 is beveled off or flattened off on one side and is thus rigidly connected with the bush 22 to rotate in unison therewith at all times.

It can be seen from FIGS. 2, 3, and 5 that the bush 22 includes at its outer end a predominantly circularly shaped flat disk 27 that is provided along its contour with an approximately saw-tooth shaped cam 28 which partially surrounds the guide bolt 20. With a rotation of the disk 27, the saw-tooth shaped cam 28 takes along the guide bolt 20 which is positively guided in the slot 21 and displaces the shifting rod 14 in the channel 12 whereby the adjusting motor is acted upon alternately with vacuum. The end positions of the shifting rod 14 are limited by the guide slot 21. A rigid connection between the temperature control device 4 and the shifting rod 14 is avoided with the aid of the bush 22 and the disk 27 disposed at its end so that a stressing and possible jamming of the two parts is eliminated.

FIGS. 1 and 5 illustrate how the connecting pin 24 of the rotary knob 8 is guided at its end extending out of the cylindrical housing part 10 within a flange or collar 29 and is retained at the instrument panel 31 by means of a snap ring 30 and the collar 29. The collar 29 is threaded into a reinforcing ring 32 of the cylindrical housing part 10. It is additionally advantageous if the rotary knob 8 engages in a detent or locks in both of its end positions so that no undesired adjustment of the selected climate condition can take place.

OPERATION

The operation of the control device according to the present invention is as follows:

The driver, depending on the outside temperature, selects a predetermined position of the flap control switch 2 of "air-conditioning on" or of "air-conditioning off" in that he adjusts the rotary knob 8 either into the one end position "air-conditioning off" (FIG. 2) or into the adjusting range of the temperature control device 4, i.e., "air-conditioning on" (FIG. 3). The shifting rod 14 assures thereby that one of the two vacuum lines 5 or 7 is connected with the vacuum line 6 which itself is connected with the suction pipe of the engine whereby a corresponding adjustment of the adjusting motor takes place. If now, for example, the air-conditioning installation is turned on, as illustrated in FIG. 3, then the temperature switch 4 can be rotated by means of the rotary knob 8 up to its end abutment (lowest air temperature of the air-conditioning installation) without moving the shifting rod 14 out of its position "air-conditioning on." Consequently, within the range of "air-conditioning on," the temperature is controlled by the temperature switch 4 to a predetermined temperature level without causing the vacuum line 5 to respond.

While we have shown and described only one embodiment in accordance with the present invention, it is understood that the same is not limited thereto but is susceptible of numerous changes and modifications as known to those skilled in the art, and we therefore do not wish to be limited to the details shown and described herein, but intend to cover all such changes and modifications as are encompassed by the scope of the appended claims.

What we claim is:

1. A control device for controlling the heating and air-conditioning installations in motor vehicles by setting a desired temperature and by controlling an adjusting motor for actuating fresh-air or warm-air flap means, the control device comprising a flap control switch means for providing initial control of the adjusting motor for placing the fresh-air or warm-air flap means in a predetermined position, a temperature switch means for setting a desired temperature, and a rotary knob means for controlling the flap switch means into a preselected condition of "air-conditioning off" or "air-conditioning on", the rotary knob means also serving for controlling the temperature switch means to a desired temperature via a lost-motion connection means.

2. A control device according to claim 1, characterized in that the flap control switch means includes a shifting rod movable between positions of "air-conditioning on" and "air-conditioning off," and that the temperature switch means is adjustable within an angular range of less than 330° without changing the shifting rod in its position "air-conditioning on."

3. A control device for controlling the heating and air-conditioning installations in motor vehicles by controlling an adjusting motor actuating fresh-air or warm-air flap means, characterized in that the control device includes a flap control switch means and a temperature switch means for controlling the adjusting motor, and in that the flap control switch means is controlled by a rotary knob means into a preselected condition of "air-conditioning off" or "air-conditioning on", the flap control switch means and the temperature switch means being arranged in a common housing means, the flap control switch means including a substantially pot-shaped cylindrical housing part that is open laterally, and an elongated housing part which is in communication with the cylindrical housing part by way of a channel that terminates in the atmosphere at its end opposite its cylindrical housing part.

4. A control device according to claim 3, in which the adjusting motor is operated by vacuum, characterized in that three vacuum lines disposed one adjacent the other, terminate laterally in the housing channel, of which the center vacuum line is adapted to be connected with a suction pipe of an engine and the two other vacuum lines are adapted to be connected to the adjusting motor.

5. A control device according to claim 4, characterized in that a shifting rod is arranged in the housing channel which projects partially into the cylindrical housing part.

6. A control device according to claim 5, characterized in that the shifting rod has a smaller diameter than the housing channel and includes two sections which are provided with sealing means sealingly sliding along the walls of the housing channel.

7. A control device according to claim 6, characterized in that the sections are arranged at such a distance from one another that the vacuum line in communication with the suction pipe is operatively connected at any time with only one of the other two vacuum lines of the adjusting motor by way of the space enclosed by the sealing means.

8. A control device according to claim 7, characterized in that the shifting rod includes a guide sleeve means at its end projecting into the cylindrical housing part, said guide sleeve means being rotatably connected at its one end with the shifting rod, and the other end of said guide sleeve means receiving a guide bolt that engages in a guide slot disposed in a part of the housing means.

9. A control device according to claim 8, characterized in that the part of the housing means provided with the guide slot is a housing cover.

10. A control device according to claim 8, characterized in that an offset bush means is arranged in the cylindrical housing part, into which engage a connecting means of the temperature switch means and a connecting means of the rotary knob means.

11. A control device according to claim 10, characterized in that the connecting means are pin-shaped elements.

12. A control device according to claim 10, characterized in that the connecting means of the rotary knob means is provided with a groove-shaped recess extending over a predetermined angle of the circumference thereof into which the bush means is adapted to rotatably engage by means of a nose portion.

13. A control device according to claim 12, characterized in that the connecting means of the temperature switch means is flattened off on one side and is thus connected with the bush means to rotate in unison therewith.

14. A control device according to claim 13, characterized in that the bush means includes at its one end a predominantly circularly shaped disk that is provided along its contour with an approximately saw-toothed shaped cam that partially surrounds the guide bolt.

15. A control device according to claim 14, characterized in that the connecting means of the rotary knob means is guided at its end projecting out of the cylindrical housing part in a collar means and is retained by means of a snap ring.

16. A control device according to claim 15, characterized in that the collar means is threaded into a reinforcing ring of the cylindrical housing part.

17. A control device according to claim 16, characterized in that the rotary knob means locks in its two end positions.

18. A control device according to claim 17, characterized in that the temperature switch means is adjustable within an angular range of less than 330° without changing the shifting rod in its position "air-conditioning on."

19. A control device according to claim 3, characterized in that a shifting rod is arranged in the housing channel which projects partially into the cylindrical housing part.

20. A control device according to claim 19, characterized in that the shifting rod has a smaller diameter than the housing channel and includes two sections which are provided with sealing means sealingly sliding along the walls of the housing channel.

21. A control device according to claim 19, characterized in that the shifting rod includes a guide sleeve means at its end projecting into the cylindrical housing part, said guide sleeve means being rotatably connected at its one end with the shifting rod, and the other end of said guide sleeve means receiving a guide bolt that engages in a guide slot disposed in a part of the housing means.

22. A control device according to claim 21, characterized in that the part of the housing means provided with the guide slot is a housing cover.

23. A control device according to claim 3, characterized in that an offset bush means is arranged in the cylindrical housing part, into which engage a connecting means of the temperature switch means and a connecting means of the rotary knob means.

24. A control device according to claim 23, characterized in that the connecting means are pin-shaped elements.

25. A control device according to claim 23, characterized in that the connecting means of the rotary knob means is provided with a groove-shaped recess extending over a predetermined angle of the circumference thereof into which the bush means is adapted to rotatably engage by means of a nose portion.

26. A control device according to claim 25, characterized in that the connecting means of the temperature switch means is flattened off on one side and is thus connected with the bush means to rotate in unison therewith.

27. A control device according to claim 23, characterized in that the shifting rod includes a guide sleeve means at its end projecting into the cylindrical housing part, said guide sleeve means being rotatably connected at its one end with the shifting rod, and the other end of said guide sleeve means receiving a guide bolt that engages in a guide slot disposed in a part of the housing means.

28. A control device according to claim 27, characterized in that the bush means includes at its one end a predominantly circularly shaped disk that is provided along its contour with an approximately saw-toothed shaped cam that partially surrounds the guide bolt.

29. A control device according to claim 23, characterized in that the connecting means of the rotary knob means is guided at its end projecting out of the cylindrical housing part in a collar means and is retained by means of a snap ring.

30. A control device according to claim 29, characterized in that the collar means is threaded into a reinforcing ring of the cylindrical housing part.

31. A control device according to claim 1 characterized in that the rotary knob means has two end positions of rotation and locks in its two end positions.

* * * * *